(12) United States Patent
Yoshino et al.

(10) Patent No.: US 6,276,245 B1
(45) Date of Patent: Aug. 21, 2001

(54) BAR WORK LOADING APPARATUS FOR HEAD TRAVELING TYPE VERTICAL MACHINE TOOL AND BAR WORK LOADING METHOD FOR USE IN HEAD TRAVELING TYPE VERTICAL MACHINE TOOL

(75) Inventors: Shizuki Yoshino, Chiba; Kimitaka Ohtake, Ibaraki; Hiroshi Inaba, Chiba, all of (JP)

(73) Assignee: Hitachi Seiki Co., Ltd., Abiko (JP)

(*) Notice: Subject to any disclaimer, the term of this patent is extended or adjusted under 35 U.S.C. 154(b) by 0 days.

(21) Appl. No.: 09/386,162

(22) Filed: Aug. 31, 1999

(30) Foreign Application Priority Data

Sep. 2, 1998 (JP) .................................. 10-248358

(51) Int. Cl.[7] ...................................... B23B 13/00
(52) U.S. Cl. ............................ 82/124; 126/127; 126/162
(58) Field of Search ........................ 82/124, 122, 125, 82/126, 127, 162, 170

(56) References Cited

U.S. PATENT DOCUMENTS

| | | | |
|---|---|---|---|
| 3,792,633 | * 2/1974 | Filipiev et al. | 82/122 X |
| 4,617,847 | * 10/1986 | Schaldach | 82/127 |
| 4,977,801 | * 12/1990 | Fabbri | 82/127 |
| 5,697,270 | * 12/1997 | Link | 82/129 |
| 6,000,305 | * 12/1999 | Link | 82/129 |

* cited by examiner

Primary Examiner—Henry Tsai
(74) Attorney, Agent, or Firm—Armstrong, Westerman, Hattori, McLeland & Naughton, LLP

(57) ABSTRACT

A bar work loading apparatus for loading a bar work into a head traveling type vertical machine tool. The machine tool has a headstock rotatably supporting an approximately vertical main spindle and movable in the direction of the axis of the main spindle and a direction perpendicularly intersecting the axis of the main spindle. A chuck is provided at the lower end of the main spindle. The machine tool further has a controller for controlling the movement of the headstock and the rotation of the main spindle and also controlling the opening and closing operation of the chuck. The bar work loading apparatus is provided near the machine tool in side-by-side relation and has a holding member capable of holding at least one bar work in such a manner that the axial direction of the bar work is parallel to the axial direction of the main spindle at least at a work receiving position where the chuck receives the bar work, which is in a range within which the center axis of the main spindle is movable.

17 Claims, 13 Drawing Sheets

BAR WORK LOADING APPARATUS FOR HEAD TRAVELING TYPE VERTICAL MACHINE TOOL AND BAR WORK LOADING METHOD FOR USE IN HEAD TRAVELING TYPE VERTICAL MACHINE TOOL

BACKGROUND OF THE INVENTION

The present invention relates to a bar work loading apparatus for a head traveling type vertical machine tool in which a main spindle having an axis of rotation extending approximately vertically is rotatably supported by a headstock that is movable in the directions of at least two axes. The bar work loading apparatus inserts a bar work into the main spindle from a side thereof closer to a chuck provided at the lower end of the main spindle. The present invention also relates to a bar work loading method for use in a head traveling type vertical machine tool.

There is a head traveling type vertical machine tool having a headstock that rotatably supports a main spindle having an axis of rotation extending in the vertical direction or tilted at a predetermined angle with respect to the vertical direction. The headstock is moved to machine a work held by a chuck provided at the lower end of the main spindle with a machining tool provided below the chuck. The head traveling type vertical machine tool has such advantages that it does not need a transfer loader for transferring a work to the main spindle, and the work transfer mechanism is simplified. Such a head traveling type vertical machine tool is generally used to machine works whose axial length is substantially equal to or shorter than the diameter thereof. There has heretofore been no bar work loading apparatus usable for a head traveling type vertical machine tool to perform a bar work machining operation in which a bar work whose axial length is longer than the diameter thereof is loaded into the main spindle and successively advanced so as to project from the chuck by a necessary length for each machining process, and machining is carried out with respect to the projecting portion of the bar work.

Japanese Patent Post-Examination Publication Number 5-13761 (1993) is publicly known as an apparatus for loading bar works into a vertical lathe that is not of the head traveling type. In the known apparatus, a bar work is loaded into the main spindle from the rear, that is, from above.

If a bar work loading apparatus such as that disclosed in Japanese Patent Post-Examination Publication Number 5-13761 (1993) is applied to a head traveling type vertical machine tool as it is, the overall height of the system comprising the machine tool and the bar work loading apparatus becomes unfavorably high, and the bar work loading apparatus is likely to interfere with the ceiling of the factory. For this reason, the system including the bar work loading apparatus cannot be installed in a low-ceilinged factory. There is also a problem that the axial length of bar works to be machined is unfavorably limited because of the necessity of avoiding interference between the bar work loading apparatus and the ceiling of the factory. Moreover, the operation of setting bar works in the bar work loading apparatus placed at a high position is not easy, and there is a danger of an accident occurring. That is, the operator may drop a bar work accidentally. Thus, the bar work setting operation also involves a problem in terms of safety.

SUMMARY OF THE INVENTION

Accordingly, an object of the present invention is to provide a bar work loading apparatus for a head traveling type vertical machine tool, in which a bar work is inserted into a main spindle from a side thereof closer to a chuck provided at the lower end of the main spindle, thereby improving the bar work loading apparatus in both operability and safety. Another object of the present invention is to provide a bar work loading method for use in a head traveling type vertical machine tool.

To attain the above-described objects, the present invention provides a bar work loading apparatus for a head traveling type vertical machine tool. The head traveling type vertical machine tool has a main spindle having an axis of rotation extending approximately in the vertical direction, and a headstock rotatably supporting the main spindle. The headstock is movable in at least the direction of the axis of the main spindle and a direction perpendicularly intersecting the axis of the main spindle. A chuck is provided at the lower end of the main spindle. The head traveling type vertical machine tool further has a controller for controlling the movement of the headstock and the rotation of the main spindle and also controlling the opening and closing operation of the chuck. The bar work loading apparatus is provided in the vicinity of the head traveling type vertical machine tool in side-by-side relation to load the head traveling type vertical machine tool with a bar work whose axial length is longer than the diameter thereof. The bar work loading apparatus includes a holding member capable of holding at least one bar work whose axial length is longer than the diameter thereof in such a manner that the axial direction of the bar work is parallel to the direction of the axis of the main spindle at least at a work receiving position where the chuck receives the bar work. The holding member faces opposite to the chuck at the work receiving position in a range within which the center axis of the main spindle is movable.

In the above-described bar work loading apparatus for a head traveling type vertical machine tool, it is preferable that the headstock be movable only in the direction of the axis of the main spindle and in a horizontal direction perpendicularly intersecting the axis of the main spindle, and that the work receiving position of the holding member be on the path of travel in the horizontal direction of the center axis of the main spindle.

In addition, the above-described bar work loading apparatus for a head traveling type vertical machine tool preferably has a work loading assisting unit at a position in the vicinity of the work receiving position of the holding member and in the range within which the center axis of the main spindle is movable. The work loading assisting unit is provided with a staircase-shaped abutment surface for supporting the bar work.

In addition, the above-described bar work loading apparatus for a head traveling type vertical machine tool preferably has a lifting unit provided in the vicinity of the work receiving position of the holding member to lift the bar work at the work receiving position in the axial direction.

In addition, the above-described bar work loading apparatus for a head traveling type vertical machine tool preferably has a work locking unit provided in the vicinity of the work receiving position of the holding member. The work locking unit is capable of axially locking and unlocking the bar work at the work receiving position.

In the above-described bar work loading apparatus for a head traveling type vertical machine tool, a centering unit may be provided in the vicinity of the work receiving position of the holding member to center an upper end portion of the bar work at the work receiving position.

In the above-described bar work loading apparatus for a head traveling type vertical machine tool, it is referable that the holding member be capable of swiveling with a plurality of bar works held thereon and capable of positioning a desired bar work with respect to the work receiving position by swiveling.

The above-described bar work loading apparatus for a head traveling type vertical machine tool may be installed in a pit formed in a floor surface.

In addition, the present invention provides a bar work loading method for use in a system including a head traveling type vertical machine tool and a bar work loading apparatus. The head traveling type vertical machine tool has a main spindle with an axis of rotation extending approximately in the vertical direction, and a headstock rotatably supporting the main spindle. The headstock is movable in at least the direction of the axis of the main spindle and a direction perpendicularly intersecting the axis of the main spindle. A chuck is provided at the lower end of the main spindle. The head traveling type vertical machine tool further has a controller for controlling the movement of the headstock and the rotation of the main spindle and also controlling the opening and closing operation of the chuck. The bar work loading apparatus is provided in the vicinity of the head traveling type vertical machine tool in side-by-side relation to load the head traveling type vertical machine tool with a bar work whose axial length is longer than the diameter thereof. The bar work loading apparatus has a holding member capable of holding at least one bar work whose axial length is longer than the diameter thereof in such a manner that the axial direction of the bar work is parallel to the direction of the axis of the main spindle at least at a work receiving position where the chuck receives the bar work. The holding member faces opposite to the chuck at the work receiving position in a range within which the center axis of the main spindle is movable. The method includes the steps of moving the headstock to the work receiving position, inserting the bar work into the main spindle from a side thereof closer to the chuck, and advancing the bar work further into the main spindle by moving the headstock and the bar work relative to each other.

In the above-described bar work loading method, the bar work loading apparatus may have a work loading assisting unit provided at a position in the vicinity of the work receiving position of the holding member and in the range within which the center axis of the main spindle is movable. The work loading assisting unit is provided with a staircase-shaped abutment surface for supporting the bar work. In this case, the step of inserting the bar work into the main spindle from a side thereof closer to the chuck may be carried out by lowering the headstock in the direction of the axis of the main spindle. In addition, the step of advancing the bar work further into the main spindle by moving the headstock and the bar work relative to each other may include the steps of moving the headstock so that the distal end of the bar work held by the chuck abuts on the abutment surface of the work loading assisting unit, and opening the chuck and lowering the headstock, thereby advancing the bar work further into the main spindle.

In the above-described bar work loading method, the bar work loading apparatus may have a lifting unit provided in the vicinity of the work receiving position of the holding member to lift the bar work at the work receiving position in the axial direction. In this case, the step of inserting the bar work into the main spindle from a side thereof closer to the chuck may be carried out by lifting the bar work with the lifting unit. In addition, the step of advancing the bar work further into the main spindle by moving the headstock and the bar work relative to each other may be carried out by lifting the bar work with the lifting unit.

In the above-described bar work loading method, the bar work loading apparatus may have a work locking unit provided in the vicinity of the work receiving position of the holding member. The work locking unit is capable of axially locking and unlocking the bar work at the work receiving position. In this case, the step of inserting the bar work into the main spindle from a side thereof closer to the chuck may be carried out by lowering the headstock in the direction of the axis of the main spindle. In addition, the step of advancing the bar work further into the main spindle by moving the headstock and the bar work relative to each other may include the steps of opening the work locking unit and closing the chuck and then lifting the headstock, thereby lifting the bar work held by the chuck, and closing the work locking unit and opening the chuck and then lowering the headstock, thereby advancing the bar work further into the main spindle.

In the above-described bar work loading method, the bar work loading apparatus may have a work loading assisting unit provided at a position in the vicinity of the work receiving position of the holding member and in the range within which the center axis of the main spindle is movable. The work loading assisting unit is provided with a staircase-shaped abutment surface for supporting the bar work. The bar work loading apparatus may further have a lifting unit provided in the vicinity of the work receiving position of the holding member to lift the bar work at the work receiving position in the axial direction. In this case, the step of inserting the bar work into the main spindle from a side thereof closer to the chuck may be carried out by lifting the bar work with the lifting unit. Alternatively, the inserting step may be carried out by lifting the bar work to a predetermined position with the lifting unit and lowering the headstock in the direction of the axis of the main spindle, thereby inserting the bar work into the main spindle. In addition, the step of advancing the bar work further into the main spindle by moving the headstock and the bar work relative to each other may include the steps of moving the headstock so that the distal end of the bar work held by the chuck abuts on the abutment surface of the work loading assisting unit, and opening the chuck and lowering the headstock, thereby advancing the bar work further into the main spindle.

The above and other objects, features and advantages of the present invention will become more apparent from the following description of the preferred embodiments thereof, taken in conjunction with the accompanying drawings.

DETAILED DESCRIPTION OF PREFERRED EMBODIMENTS

Figure 1:
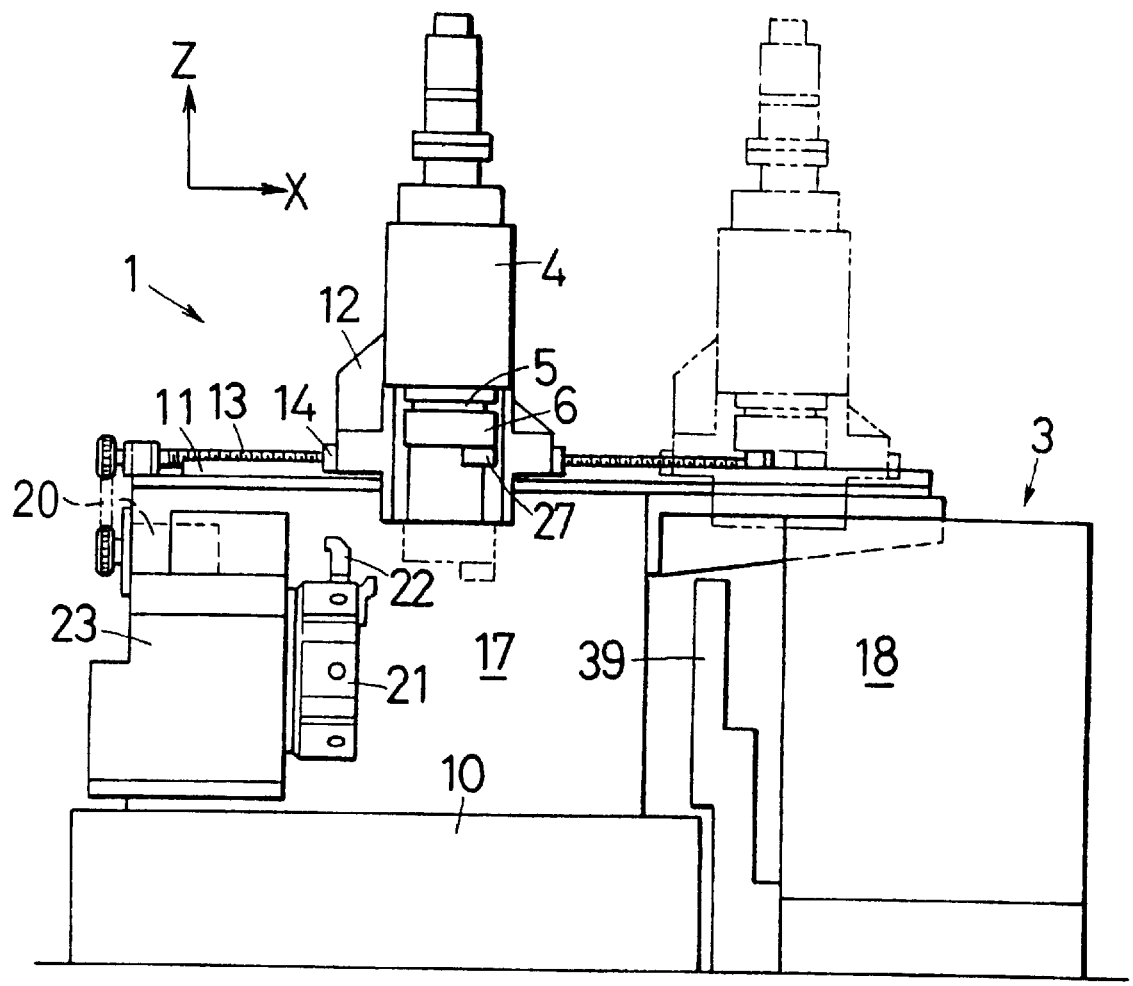
FIG. 1 is a front view showing a head traveling type vertical machine tool and a bar work loading apparatus according to the present invention.
Figure 2:
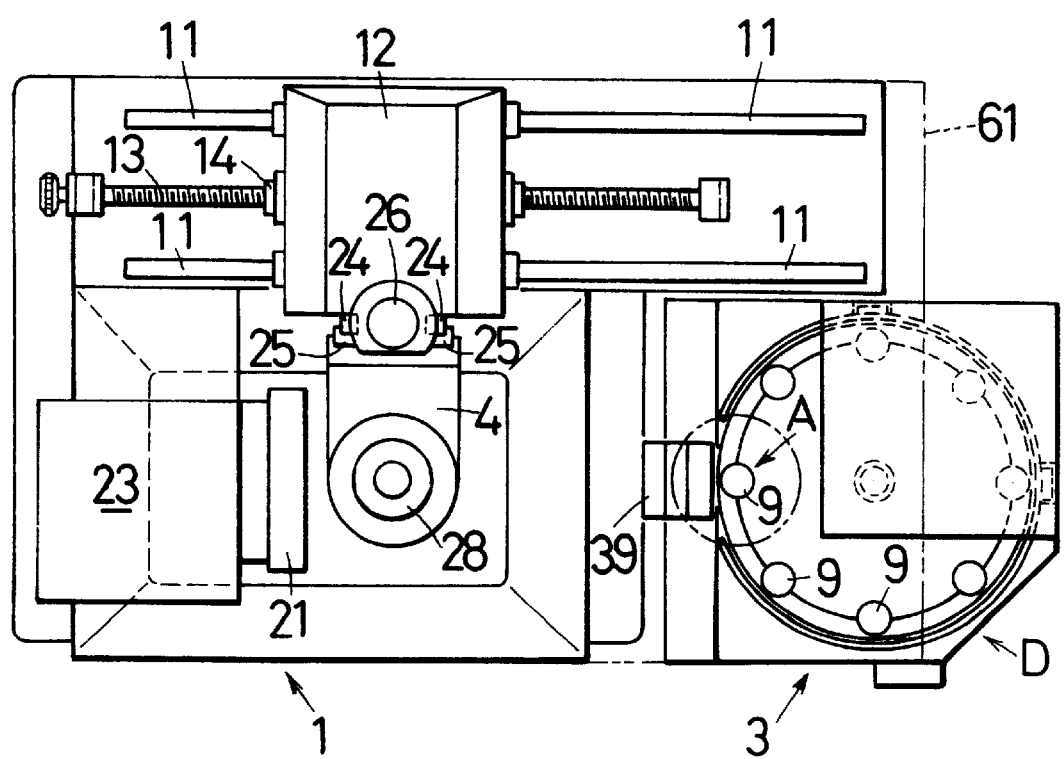
FIG. 2 is a plan view of the head traveling type vertical machine tool and the bar work loading apparatus.

An embodiment of the present invention will be described below with reference to the accompanying drawings. FIG. 1 is a front view showing a head traveling type vertical machine tool 1 and a bar work loading apparatus 3 according to the present invention that is provided in the vicinity of the head traveling type vertical machine tool 1. In this embodiment, the head traveling type vertical machine tool 1 is a vertical lathe by way of example. FIG. 2 is a plan view showing the head traveling type vertical machine tool 1 and the bar work loading apparatus 3. The head traveling type vertical machine tool 1 has a bed 10. A tool post 23 is provided on the bed 10. An indexable turret 21 is provided on the tool post 23. Machining tools 22, e.g. an external cutting tool and an internal cutting tool, are held on the outer peripheral portion of the turret 21.

X-axis guide rails 11 are provided above the tool post 23 and the turret 21. The X-axis guide rails 11 extend along an X-axis direction (horizontal direction) perpendicularly intersecting a Z-axis direction that is parallel to the axial direction of a main spindle 5. A column 12 is provided on the X-axis guide rails 11 so as to be movable in the X-axis direction. The column 12 is moved in the X-axis direction by a combination of an X-axis feed screw 13 rotatively driven by an X-axis servomotor 20 and a nut 14 screwed onto the X-axis feed screw 13 and secured to the column 12. Z-axis guide rails 24 are provided on the column 12 to extend in a vertical direction (Z-axis direction). A headstock 4 is provided to be movable in the Z-axis direction by a combination of the Z-axis guide rails 24 and slide blocks 25, which constitute a rectilinear rolling guide. The headstock 4 is moved in the Z-axis direction by rotatively driving a Z-axis feed screw (not shown) by a Z-axis servomotor 26.

The main spindle 5 has an axis of rotation in the vertical direction and is rotatably supported by the headstock 4. The main spindle 5 has a hollow chuck (hereinafter referred to as "chuck") 6 provided at the lower end thereof. The chuck 6 is actuated to open or close gripping members 27 through a draw tube (not shown) by driving a hollow chuck cylinder (hereinafter referred to as "chuck cylinder") 28 provided at the upper end of the main spindle 5. Thus, the chuck 6 is capable of holding a work. The chuck 6 and the chuck cylinder 28 are connected by a hollow draw tube capable of selectively advancing or retracting in the center hole of the main spindle 5. It should be noted that the chuck 6 may be a collet chuck.

The main spindle 5, which is supported by the headstock 4, is movable in both the X- and Z-axis directions. The main spindle 5 supported by the headstock 4 is driven to rotate, and while doing so, the main spindle 5 is moved in the X- and Z-axis directions under the control of an NC (Numerical Control) system (not shown), thereby machining a work held by the chuck 6 with a machining tool 22 on the turret 21. The rotational drive of the main spindle 5 is performed by a built-in motor incorporated between the headstock 4 and the main spindle 5.

A machining area 17 in which the headstock 4 may move during machining is covered with a cover and a splash guard (which are not shown in FIG. 1). A work transfer area 18 is provided in the neighborhood of the machining area 17. The machining area 17 and the work transfer area 18 are divided by a cover capable of being selectively opened or closed. In the case of machining normal short works (i.e. works whose axial length is equal to or shorter than the diameter thereof), a work feeder is installed in the work transfer area 18, and works can be placed on a plurality of pallets on the work feeder. The work feeder is provided so that each pallet can be positioned directly below the path of travel of the center axis of the main spindle 5 in the X-axis direction. Thus, the work feeder allows a plurality of works to be continuously fed into the head traveling type vertical machine tool 1.

In the head traveling type vertical machine tool 1, the draw tube in the main spindle 5, the chuck 6 and the chuck cylinder 28 are formed as hollow members, which have hollow central portions, for the purpose of machining bar works 9 whose axial length is longer than the diameter thereof. Accordingly, a bar work 9 can be inserted into the draw tube and so forth. The bar work 9 inserted into the draw tube and so forth is held in such a manner as to project from the chuck 6 by a predetermined length. After being subjected to a desired machining process, the projecting portion of the bar work 9 is cut off with a cut-off tool or the like to obtain a finished product. Thereafter, the bar work 9 is advanced and held in such a manner as to project from the chuck 6 by a predetermined length. Thus, the projecting portion of the bar work 9 is continuously machined in the same way as the above.

To allow a bar work 9 to project from the chuck 6 by a predetermined length, after the headstock 4 has been positioned above a reference plane, the headstock 4 is lowered in the Z-axis direction to a position where the lower end of the bar work 9 and the reference plane have a predetermined gap therebetween. Then, the chuck 6 is opened to allow the bar work 9 to lower until the lower end of the bar work 9 abuts on the reference plane. Then, with the chuck 6 kept open, the headstock 4 is lifted in the Z-axis direction to a predetermined position. Thereafter, the chuck 6 is closed, The bar work 9 maintains the state of abutting on the reference plane by gravity. As a result, the bar work 9 projects from the chuck 6 by a predetermined length. In other words, there is no need of a driving mechanism for projecting the bar work 9 from the chuck 6.

To load a bar work 9, the bar work loading apparatus 3 is installed in the work transfer area 18 in the neighborhood of the head traveling type vertical machine tool 1. The X-axis guide rails 11 extend in the X-axis direction as far as the position of the bar work loading apparatus 3, so that the headstock 4 is movable to a position where the chuck 6 lies directly above a bar work 9 at a work receiving position A. In addition, a work loading assisting unit 39 is provided in the vicinity of the work receiving position A of the bar work loading apparatus 3. The work loading assisting unit 39 has abutment surfaces formed in the shape of a staircase.

The head traveling type vertical machine tool 1 and the bar work loading apparatus 3 are controlled by an NC system. To load a bar work 9 onto the head traveling type vertical machine tool 1, the NC system first sends a command to the bar work loading apparatus 3. The bar work loading apparatus 3 drives a driving motor 332 (see FIG. 3) to index a subsequent bar work 9 to the work receiving position A and stops the bar work 9 there. Thereafter, the NC system controls the movement of the headstock 4, the opening and closing operation of the chuck 6 and so forth to insert the bar work 9 into the draw tube and so forth in the main spindle 5.

Figure 3:
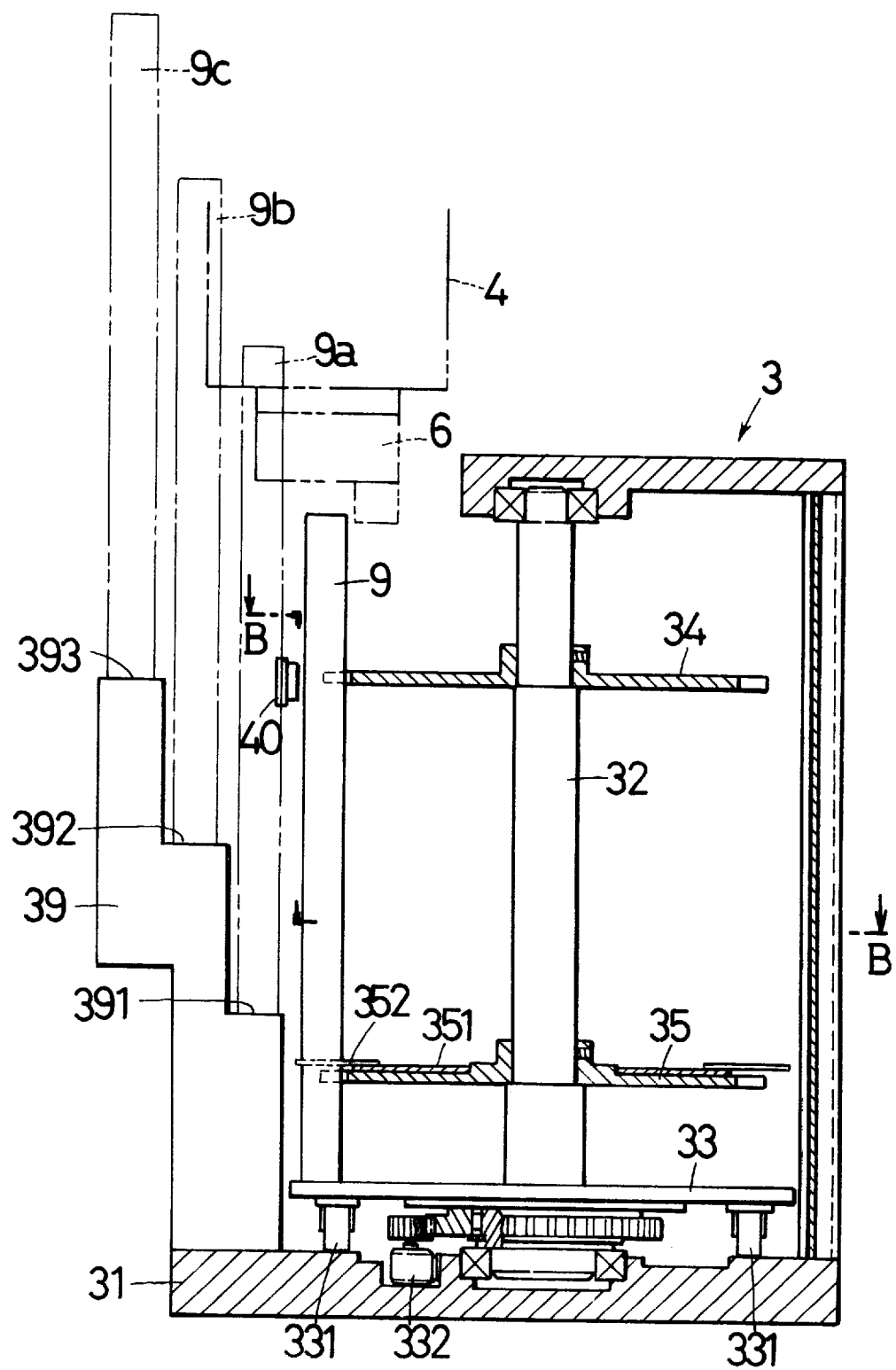
FIG. 3 is a partly-sectioned front view of a bar work loading apparatus according to a first embodiment of the present invention.

FIG. 3 is a partly-sectioned front view of the bar work loading apparatus 3 according to a first embodiment of the present invention. The bar work loading apparatus 3 has a loader body 31. A rotating shaft 32 having a vertical center axis is provided in the loader body 31 in such a manner that the rotating shaft 32 can be driven to rotate. A proximal disk 33 is secured to a lower end portion of the rotating shaft 32. The proximal disk 33 is driven to rotate together with the rotating shaft 32 by a driving motor 332. A plurality of casters 331 are installed on the lower side of the proximal disk 33. Thus, the proximal disk 33 is supported by the casters 331 so as to be able to rotate smoothly.

An upper support disk 34 and a lower support disk 35 are secured to the rotating shaft 32 to serve as holding members for holding bar works 9. The upper support disk 34 and the lower support disk 35 each have a plurality of V-shaped cut portions formed on the outer periphery thereof. Bar works 9 are supported by the respective cut portions. Each bar work 9 is supported vertically so that the axis thereof is parallel to the axis of the main spindle 5. A pitch for supporting the bar works 9 is set so that when a bar work 9 at the work receiving position A is transferred, an adjacent bar work 9 will not interfere with a movable member such as the chuck 6.

The work loading assisting unit 39 is provided in the vicinity of the work receiving position A and on the path of travel of the main spindle 5 in the X-axis direction. The work loading assisting unit 39 has a first abutment surface 391, a second abutment surface 392, and a third abutment surface 393, which are formed in the shape of a staircase. These abutment surfaces are arranged such that the lower end of a bar work 9 can abut on the abutment surfaces successively. Reference symbols 9a, 9b and 9c show a bar work as it successively abuts on the three abutment surfaces. By using the height differences between these abutment surfaces, a bar work 9 is successively advanced into the chuck 6, the draw tube and the chuck cylinder 28 from the chuck side. The heightwise distance between each pair of adjacent abutment surfaces is set slightly smaller than the stroke of the headstock 4 in the Z-axis direction.

Figure 4:
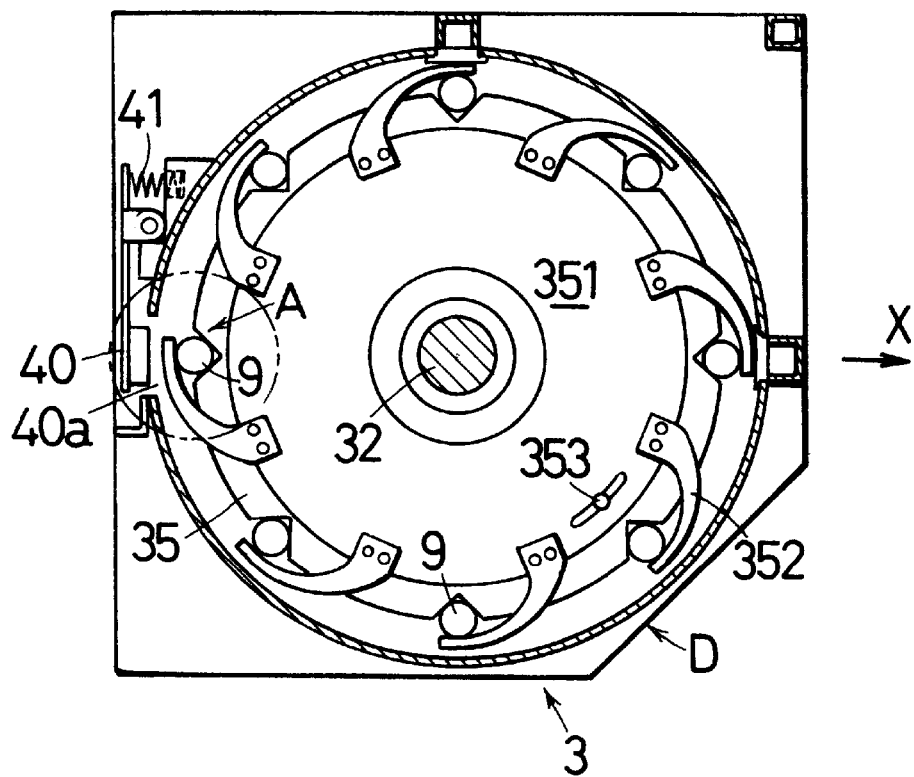
FIG. 4 is a sectional view as seen from the direction of the arrow B—B in FIG. 3.

FIG. 4 is a sectional view as seen from the direction of the arrow B—B in FIG. 3. An adjusting disk 351 is mounted on the lower support disk 35 so as to be capable of being selectively rotated or fixed. The adjusting disk 351 has positioning members 352 provided on the outer periphery thereof in correspondence to the cut portions of the lower support disk 35. The positioning members 352 are formed such that the radial position of the support surface of each positioning member 352 varies according to the rotational position of the adjusting disk 351. According to the diameter of a bar work 9 to be supported, the radial position of the support surface of each positioning member 352 is adjusted by rotating the adjusting disk 351, and the adjusting disk 351 is fixed at the adjusted position by a fixing screw 353. Thus, even if bar works have different diameters, they can be supported at accurate positions.

A bar work setup position D is where bar works 9 are set in the bar work loading apparatus 3. That is, the operator rotates the adjusting disk 351 so that the gap between each positioning member 352 and the corresponding cut portion of the lower support disk 35 is larger than the diameter of each bar work 9. Thereafter, bar works 9 are successively inserted into the respective gaps between the lower support disk 35 and the positioning members 352. Thereafter, the adjusting disk 351 is rotated to adjust the support diameter of each support portion and then fixed with the fixing screw 353.

The support diameter adjusting operation can be readily performed because the support diameters of all the support portions can be adjusted in interlocking relation to each other. Moreover, even if there are variations in diameter of bar works 9, the position of the center axis of a bar work 9 at the work receiving position A is on the X-axis although it may be displaced in the X-axis direction. Therefore, the center axis of the bar work 9 is on the path of travel of the main spindle 5 in the X-axis direction, and thus loading of the bar work 9 can be performed normally. That is, it is only necessary to change the work receiving position A appropriately by shifting it in the X-axis direction according to the diameter of bar works 9 to be loaded.

A cover 40 for preventing a bar work 9 from springing out of the support portion (hereinafter referred to as "prevention cover 40") is provided in the vicinity of the work receiving position A. The prevention cover 40 is a cover for preventing a bar work 9 from springing out from a gate portion 40a during rotation in a case where the adjustment of the adjusting disk 351 has been poorly made, for example. The prevention cover 40 is given pressing force by a spring 41. By moving the bar work 9 leftward as viewed in FIG. 4 against the pressing force, the prevention cover 40 pivotally rotates to allow the bar work 9 to leave the support portion. More specifically, the bar work 9 is held with the chuck 6 and lifted until the lower end of the bar work 9 is above the positioning member 352. Then, the bar work 9 is moved in the negative direction of the X-axis (leftward as viewed in FIG. 4).

Figure 5:
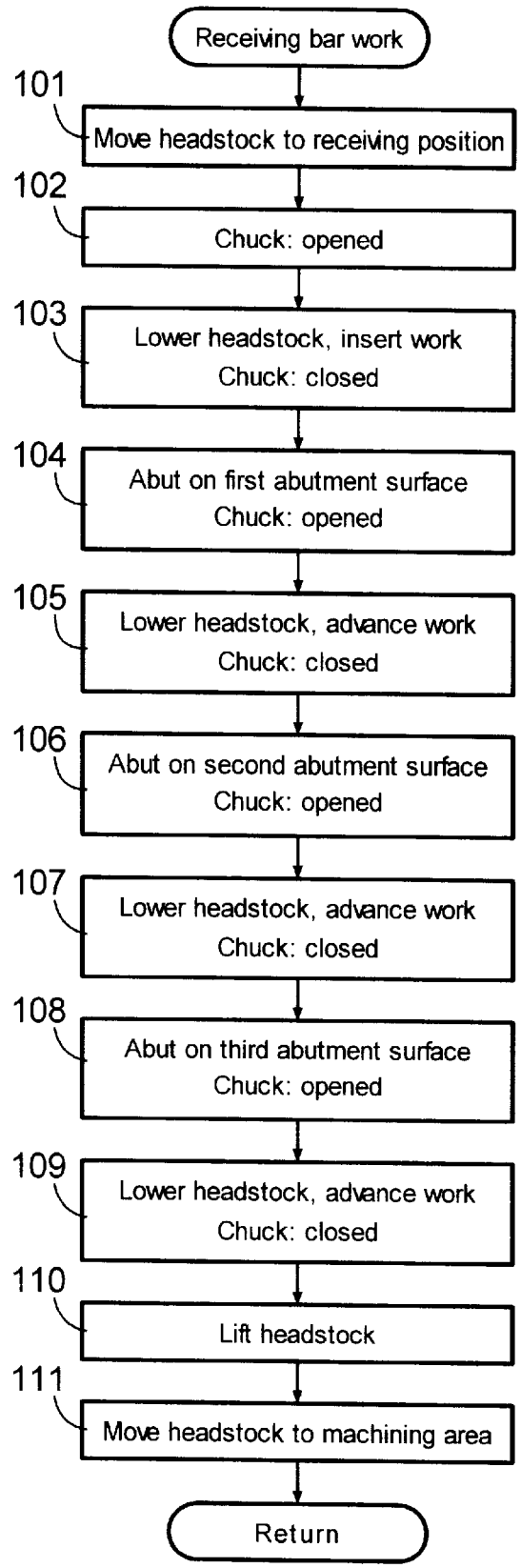
FIG. 5 is a flowchart showing a sequence of steps for loading a bar work in the first embodiment.

FIG. 5 is a flowchart showing a sequence of steps for loading a bar work 9 in the bar work loading apparatus 3 according to the first embodiment. At step 101, in a state where no bar work 9 is held with the chuck 6, the headstock 4 is moved in the X-axis direction to a position where the chuck 6 lies above the work receiving position A. At step 102, the chuck 6 is opened so that a bar work 9 can be inserted thereinto. Next, at step 103, the headstock 4 is lowered in the Z-axis direction to insert the bar work 9 into the chuck 6. Then, the chuck 6 is closed to hold the bar work 9.

At step 104, with the bar work 9 held with the chuck 6, the headstock 4 is lifted until the lower end of the bar work 9 reaches a position above the positioning member 352. Then, the headstock 4 is moved in the negative direction of the X-axis so that the lower end of the bar work 9 reaches a position directly above and close to the first abutment surface 391 of the work loading assisting unit 39. Then, the chuck 6 is opened. Consequently, the bar work 9 lowers by gravity until the lower end thereof abuts on the first abutment surface 391. Next, at step 105, the headstock 4 is lowered to advance the bar work 9 further into the main spindle 5. At a position where the headstock 4 has been lowered to the full, the chuck 6 is closed.

At step 106, the headstock 4 is lifted until the lower end of the bar work 9 reaches a position above the second abutment surface 392. Then, the headstock 4 is moved in the X-axis direction so that the lower end of the bar work 9 reaches a position directly above and close to the second abutment surface 392. Then, the chuck 6 is opened to allow the bar work 9 to lower by gravity until the lower end of the bar work 9 abuts on the second abutment surface 392. Next, at step 107, the headstock 4 is lowered to advance the bar work 9 further into the main spindle 5. At a position where the headstock 4 has been lowered to the full, the chuck 6 is closed.

Similarly, at step 108, the headstock 4 is lifted until the lower end of the bar work 9 reaches a position above the third abutment surface 393. Then, the headstock 4 is moved in the X-axis direction so that the lower end of the bar work 9 reaches a position directly above and close to the third abutment surface 393. Then, the chuck 6 is opened to allow the bar work 9 to lower by gravity until the lower end of the bar work 9 abuts on the third abutment surface 393. Next, at step 109, the headstock 4 is lowered to advance the bar work 9 further into the main spindle 5. The headstock 4 is lowered to a position that is a predetermined distance away from the third abutment surface 393. Then, the chuck 6 is closed.

At step 110, the headstock 4 is lifted, and at step 111, the headstock 4 is moved into the machining area 17. The bar work 9 is moved to a position directly above the reference plane provided in the machining area 17, where the lower end of the bar work 9 and the reference plane have a predetermined gap therebetween. Then, the chuck 6 is opened to allow the lower end of the bar work 9 to abut on the reference plane. Then, the headstock 4 is lifted in the Z-axis direction by a predetermined distance. The bar work 9 maintains the state of abutting on the reference plane by gravity. Then, the chuck 6 is closed to hold the bar work 9 in such a manner that the bar work 9 projects from the chuck 6 by a predetermined length. In a state where the bar work 9 has been inserted into the main spindle 5 in this way, desired machining is carried out in the machining area 17.

Upon completion of the machining, the portion of the bar work 9 that projects from the chuck 6 is cut off with a cut-off tool and discharged from the machining area 17 by using an unloader bucket, a discharge chute, or the like. Next, the headstock 4 is moved so that the bar work 9 reaches a position directly above the reference plane provided in the machining area 17. Then, the bar work 9 is allowed to project by a predetermined length by the opening and closing operation of the chuck 6 and the traveling operation of the headstock 4. In this way, continuous machining can be performed. Upon completion of machining for the overall length of the bar work 9, the gripped portion of the bar work 9 remaining in the chuck 6 is discharged. Then, a new bar work 9 is loaded from the bar work loading apparatus 3.

Thus, a bar work 9 is inserted into the main spindle 5 in a plurality of steps using the staircase-shaped abutment surfaces formed on the work loading assisting unit 39. Consequently, even a bar work 9 longer than the stroke of the headstock 4 in the Z-axis direction can be automatically inserted into the draw tube and so forth. Accordingly, it becomes possible to load the bar work 9 automatically. In addition, because the stroke of the headstock 4 in the Z-axis direction need not be increased excessively, the cost of the machine tool will not be increased. Although in the first embodiment the work loading assisting unit 39 is provided with three abutment surfaces, it should be noted that the number of abutment surfaces may be appropriately determined according to the stroke of the headstock 4 in the Z-axis direction and the length of bar works 9 to be machined. The number of abutment surfaces may be one or any number more than one.

Figure 6:
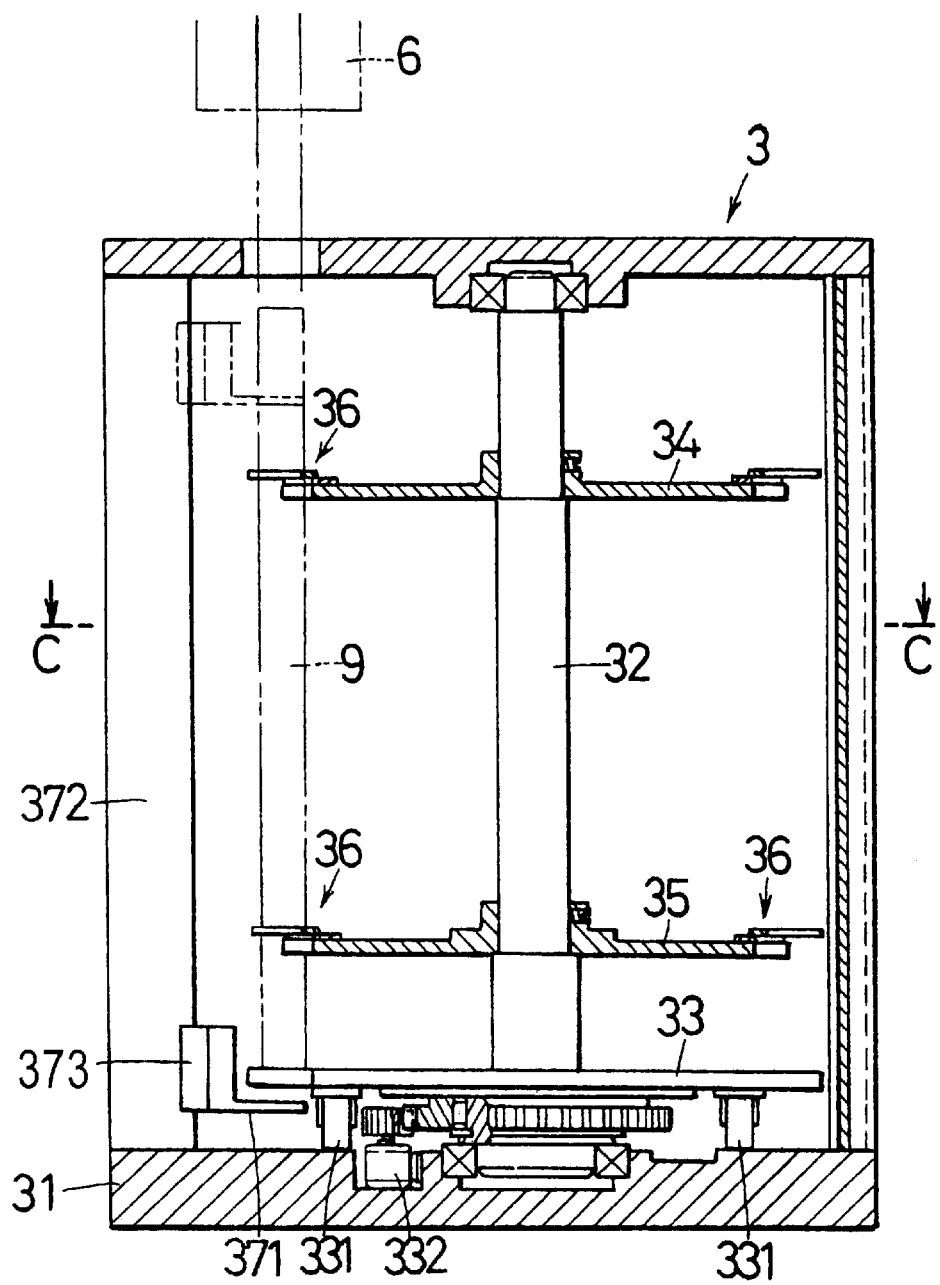
FIG. 6 is a partly-sectioned front view of a bar work loading apparatus according to a second embodiment of the present invention.

FIG. 6 is a partly-sectioned front view of a bar work loading apparatus 3 according to a second embodiment of the present invention. The bar work loading apparatus 3 has a loader body 31, and a rotating shaft 32 having a vertical center axis is provided in the loader body 31 in such a manner that the rotating shaft 32 can be driven to rotate, as in the case of the first embodiment. Furthermore, a proximal disk 33 is secured to a lower end portion of the rotating shaft 32. The proximal disk 33 is driven to rotate together with the rotating shaft 32 by a driving motor 332. A plurality of casters 331 are installed on the lower side of the proximal disk 33. Thus, the proximal disk 33 is supported by the casters 331 so as to be able to rotate smoothly. An upper support disk 34 and a lower support disk 35 are secured to the rotating shaft 32. The upper support disk 34 and the lower support disk 35 each have a plurality of V-shaped cut portions formed on the outer periphery thereof. Bar works 9 are supported by the respective cut portions. Each bar work 9 is supported vertically so that the axis thereof is parallel to the axis of the main spindle 5.

Figure 7:
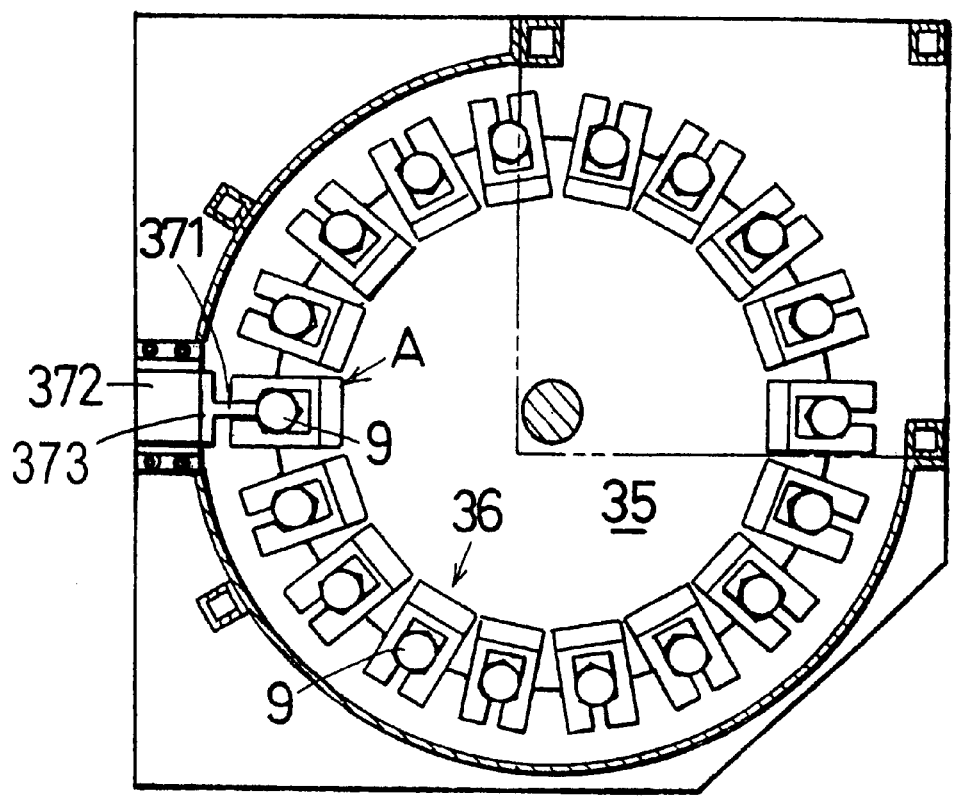
FIG. 7 is a sectional view as seen from the direction of the arrow C—C in FIG. 6.

FIG. 7 is a sectional view as seen from the direction of the arrow C—C in FIG. 6. Positioning members 36 are secured to the outer periphery of each of the upper and lower support disks 34 and 35 at respective positions corresponding to the cut portions. In the second embodiment, bar works 9 are supported at a smaller pitch than in the case of the first embodiment. Accordingly, an increased number of bar works 9 can be continuously loaded. A lifting unit 37 is provided in the vicinity of the work receiving position A. The lifting unit 37 has a lifting member 371 set so as to lie under the lower end of a bar work 9 when it is inoperative. The outer periphery of the proximal disk 33 and the positioning members 36 are provided with radial grooves so that the lifting member 371 can pass vertically through the radial grooves.

The lifting unit 37 has a lifting unit body 372 and a traveling member 373 that is vertically movable with respect to the lifting unit body 372. As the traveling member 373 of the lifting unit 37 moves upward, the lifting member 371 engages the lower end of a bar work 9 at the work receiving position A and lifts the bar work 9 in the axial direction. Accordingly, only the bar work 9 at the work receiving position A can be projected above the other bar works 9. Thus, even if the pitch for supporting bar works 9 is reduced to increase the bar work supporting density, the bar work 9 at the work receiving position A can be loaded without interference between any of the other bar works 9 and the chuck 6 or the main spindle 5. The stroke of vertical movement of the lifting unit 37 is set substantially equal to the axial length of the bar works 9. As the lifting unit 37, a rodless cylinder is preferably used. However, other driving mechanisms can also be used, for example, a combination of a driving motor and a screw mechanism, and a combination of a driving motor and a rack-and-pinion mechanism.

Figure 8:
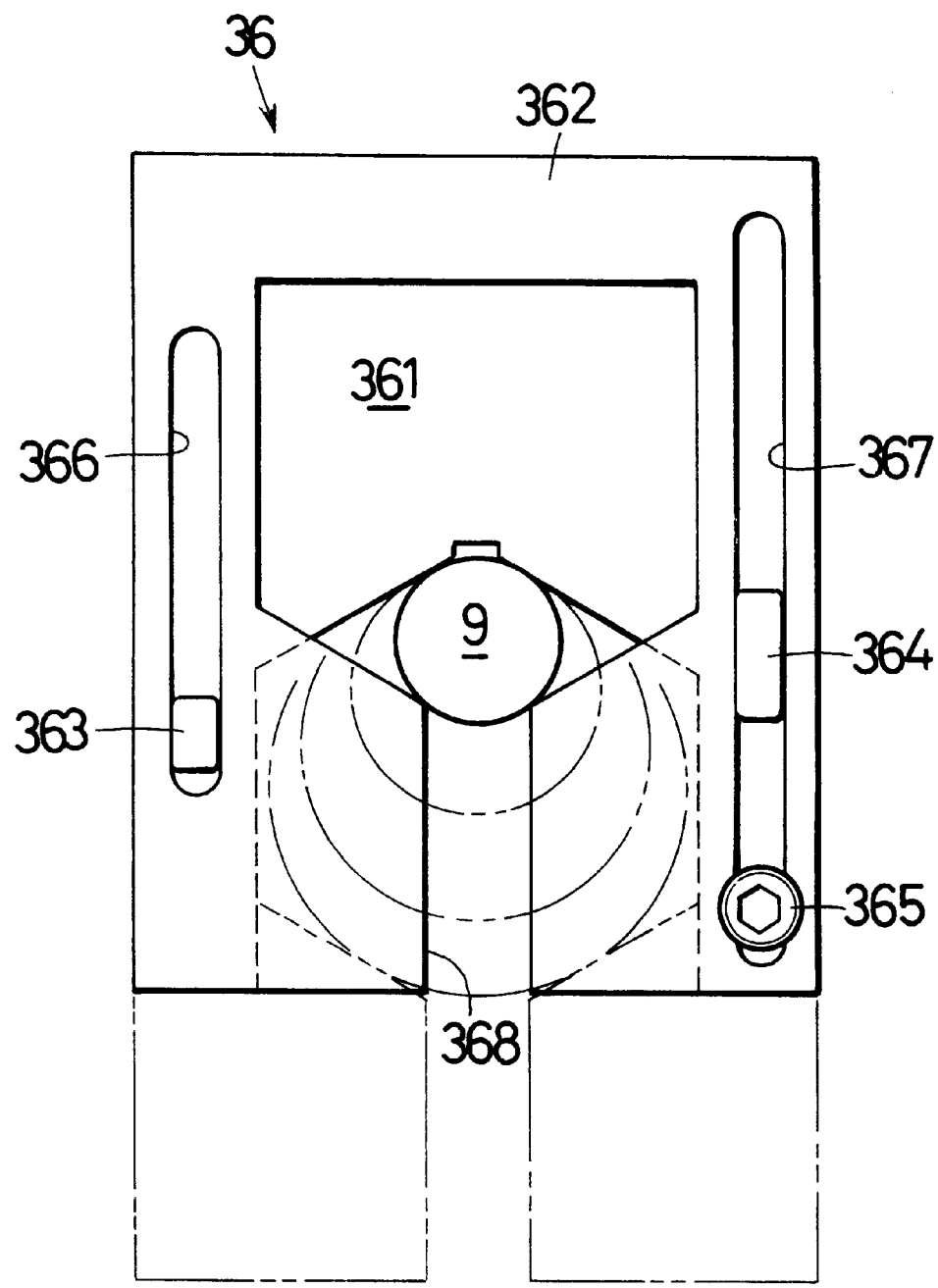
FIG. 8 is an enlarged view of a positioning member for a bar work.

FIG. 8 is an enlarged view of a positioning member 36 for a bar work 9. The positioning member 36 comprises a fixed member 361 and an adjusting member 362. The fixed member 361 is secured to a bar work support position on the outer periphery of each of the upper and lower support disks 34 and 35. The adjusting member 362 is placed on the fixed member 361, and projections 363 and 364 provided on the fixed member 361 are loosely fitted in slots 366 and 367, respectively, which are provided in the adjusting member 362. Thus, the adjusting member 362 is movable for adjustment in the radial direction of each of the upper and lower support disks 34 and 35. According to the diameter of a bar work 9 to be supported, the radial position of the adjusting member 362 is adjusted, and the adjusting member 362 is fixed at the adjusted position by using a fixing screw 365.

Thus, bar works 9 having various diameters can be supported at accurate positions, respectively, without any play. In addition, the adjusting member 362 is provided at the distal end thereof with a groove 368 for passing the lifting member 371 of the lifting unit 37. Although in this embodiment the adjusting member 362 is adjusted for each individual positioning member 36, the arrangement may be such that all the adjusting members 362 are adjusted in interlocking relation to each other as in the case of the positioning members 352 in the first embodiment.

Figure 9:
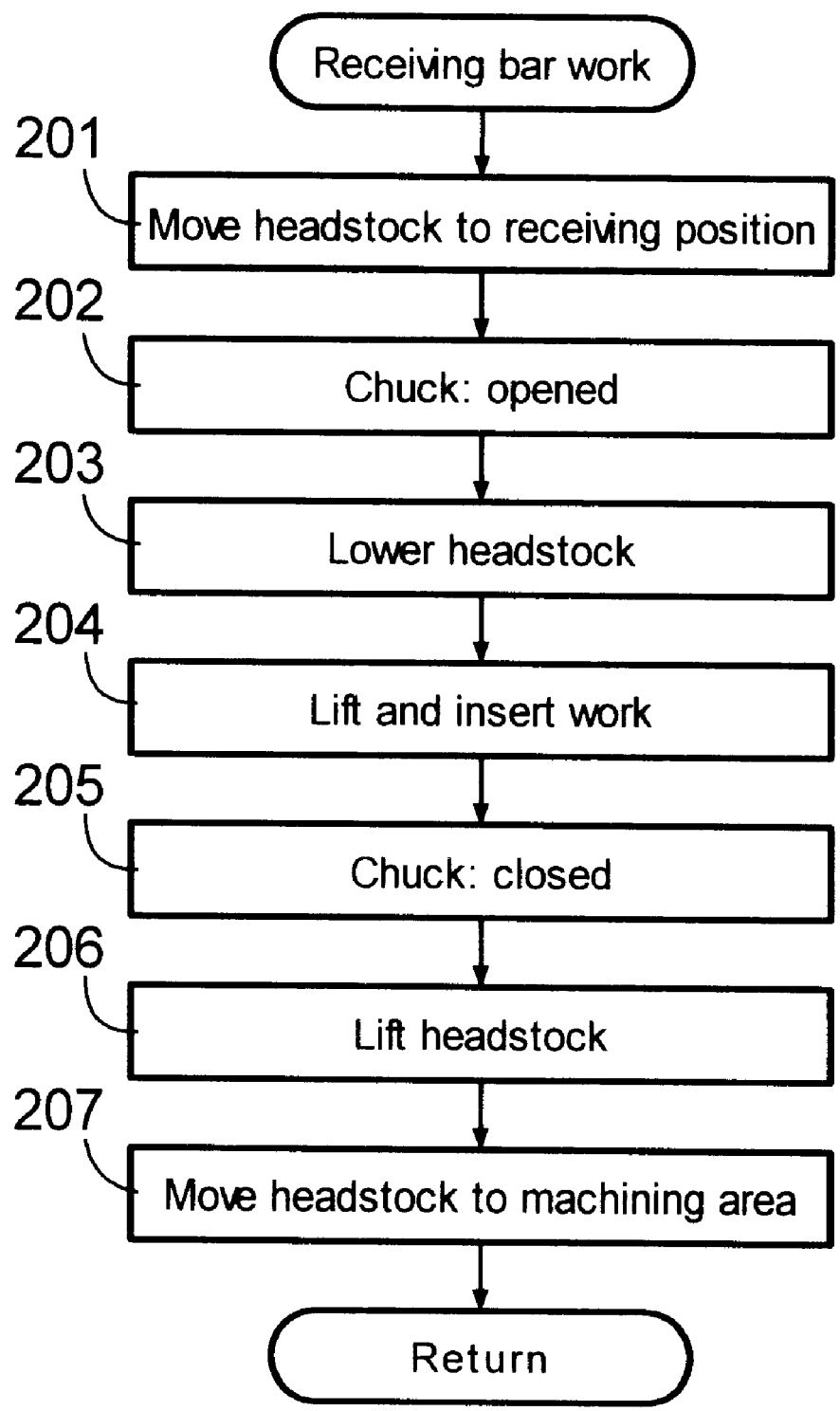
FIG. 9 is a flowchart showing a sequence of steps for loading a bar work in the second embodiment.

FIG. 9 is a flowchart showing a sequence of steps for loading a bar work 9 according to the second embodiment. At step 201, in a state where no bar work 9 is held with the chuck 6, the headstock 4 is moved in the X-axis direction to a position where the chuck 6 lies above the work receiving position A. At step 202, the chuck 6 is opened so that a bar work 9 can be inserted thereinto. Next, at step 203, the headstock 4 is lowered in the Z-axis direction to a position near the lower limit position where it does not interfere with the bar work loading apparatus 3. Next, at step 204, the bar work 9 at the work receiving position A is lifted to the upper stroke end by the lifting unit 37, thereby inserting the bar work 9 into the chuck 6 and the draw tube. Then, at step 205, the chuck 6 is closed to hold the bar work 9.

At step 206, the headstock 4 is lifted, and at step 207, the headstock 4 is moved into the machining area 17. In a state where the bar work 9 has been inserted into the main spindle 5 in this way, desired machining is carried out in the machining area 17. The machining method and the method of projecting the bar work 9 after each machining process are the same as those described in the first embodiment. Upon completion of machining for the overall length of the bar work 9, the gripped portion of the bar work 9 is discharged from the chuck 6, and a new bar work 9 is loaded from the bar work loading apparatus 3.

In the second embodiment, a bar work 9 at the work receiving position A is lifted by the lifting unit 37. Therefore, even if the bar work holding pitch is reduced to hold an increased number of bar works 9, a bar work 9 at the work receiving position A can be automatically loaded without interference between any of the other bar works 9 and the headstock 4. Accordingly, it is possible to increase the number of bar works 9 held by the bar work loading apparatus 3 and hence possible to perform continuous automatic running of the machine tool over a long period of time. Furthermore, in the second embodiment, the driving stroke of the lifting unit 37 is substantially equal to the axial length of the bar work 9. Accordingly, loading of the bar work 9 can be completed by a single lifting operation. Therefore, the time required to load the bar work 9 is minimized, advantageously.

The arrangement may be such that the driving stroke of the lifting unit 37 is not set such long, but instead, the lifting unit 37 is used to insert only the upper end of the bar work 9 into the chuck 6, and loading of the bar work 9 into the main spindle 5, which is performed thereafter, is effected by using the work loading assisting unit 39 in the first embodiment. In a case where both the lifting unit 37 and the work loading assisting unit 39 are used, if the driving stroke of the lifting unit 37 is lengthened, the number of abutment surfaces of the work loading assisting unit 39 can be reduced.

Figure 10:
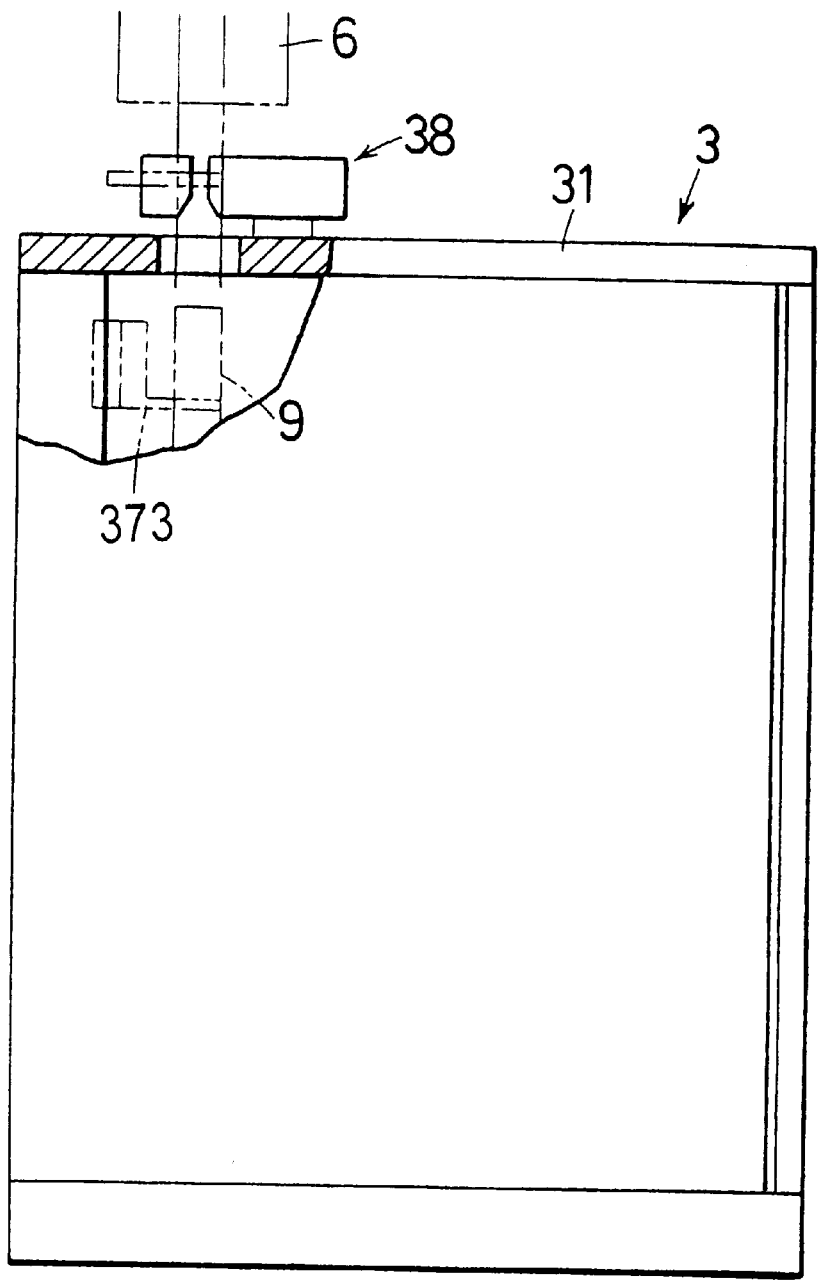
FIG. 10 is a partly-sectioned front view of a bar work loading apparatus according to a third embodiment of the present invention.

FIG. 10 is a partly-sectioned front view of a bar work loading apparatus 3 according to a third embodiment of the present invention. The bar work loading apparatus 3 according to this embodiment is particularly effective in a case where a chuck having a relatively narrow opening, such as a collet chuck, is used as the chuck 6. A centering unit 38 is provided above a bar work 9 at the work receiving position A. The centering unit 38 is installed on the top panel of the loader body 31. Because centering of the bar work 9 is carried out by the centering unit 38 at a position in the vicinity of the upper end of the bar work 9, the accuracy of position of the upper end of the bar work 9 improves. Therefore, the bar work 9 can be surely inserted into the chuck 6 even if it is a collet chuck or other similar chuck that has a relatively narrow opening.

Figure 11:
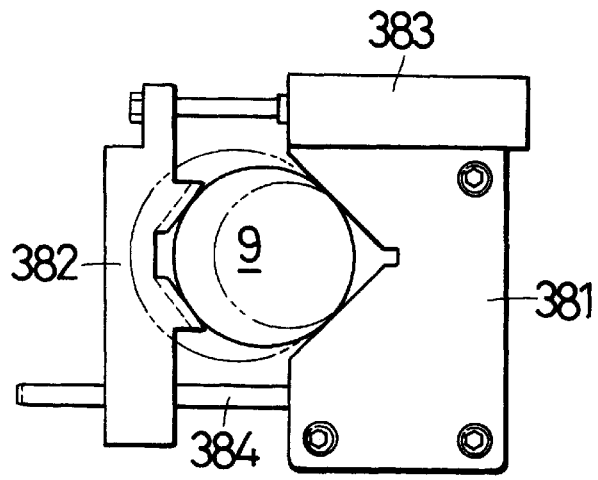
FIG. 11 is an enlarged view of a centering unit.

FIG. 11 is an enlarged view of the centering unit 38. The centering unit 38 is secured to the top panel of the loader body 31. A movable part 382 is movably provided on a guide bar 384 and driven in the X-axis direction by a cylinder 383. The bar work 9 is held between a V-groove formed on a centering unit body 381 and a V-groove formed on the movable part 382 and thus centered. Even if there are variations in diameter of bar works 9, the position of the center axis of a bar work 9 at the work receiving position A is on the X-axis although it may be displaced in the X-axis direction. Therefore, the center axis of the bar work 9 is on the path of travel of the main spindle 5 in the X-axis direction. The centering position for the bar work 9 can be readily calculated according to the diameter of the bar work 9.

The centering unit 38 is used as follows. First, the movable part 382 of the centering unit 38 is driven in the opening direction by the cylinder 383 in advance, and the bar work 9 is lifted to the inserting position by the lifting unit 37. At this time, the bar work 9 passes through the space between the centering unit body 381 and the movable part 382 and lifts as far as the inserting position. Next, the movable part 382 is driven in the clamping direction to center the bar work 9. In this state, the chuck 6 is lowered while being kept open, thereby inserting the bar work 9 into the chuck 6. Thereafter, the movable part 382 is driven in the opening direction again, and the bar work 9 is lifted by the lifting unit 37 and thus inserted into the main spindle 5.

Figure 12:
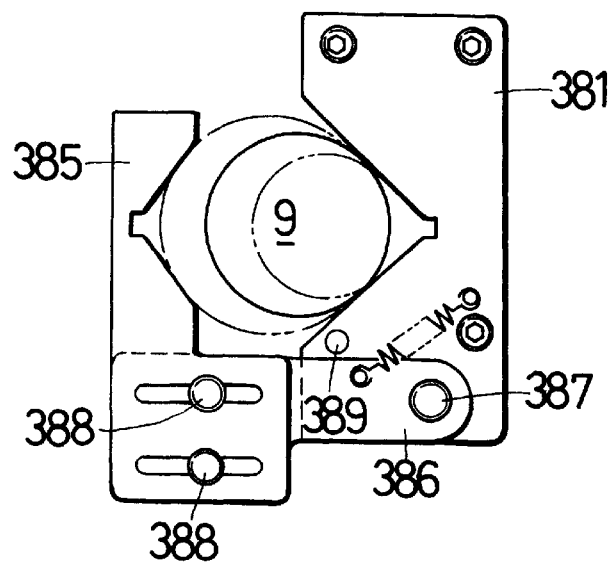
FIG. 12 is an enlarged plan view of a centering unit according to another embodiment.
Figure 13:
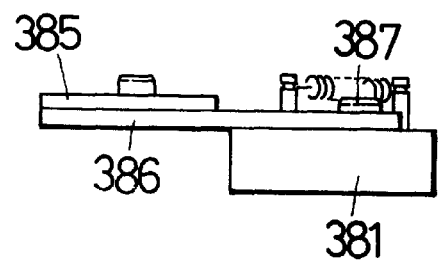
FIG. 13 is a front view of the centering unit shown in FIG. 12.

FIG. 12 is an enlarged plan view of a centering unit 38 according to another embodiment of the present invention. FIG. 13 is a front view of the centering unit 38 shown in FIG. 12. The centering unit body 381 is secured to the top panel of the loader body 31. A movable part 385 is fixed to a pivoting arm 386 by using fixing screws 388. However, if the fixing screws 388 are untightened, the position of the movable part 385 can be adjusted according to the diameter of each particular bar work 9. The pivoting arm 386 is pivotally supported by a pivot shaft 387 and urged in the clamping direction by a spring. The clamping-side position of the pivoting arm 386 is limited by a stopper 389.

The centering unit 38 in this embodiment need not drive the movable part 385 by using a cylinder or the like. The bar work 9 can be gripped and centered with urging force from the spring simply by centering the upper end portion of the bar work 9 and passing it between the centering unit body 381 and the movable part 385. After the upper end portion of the bar work 9 has been held with the chuck 6, the headstock 4 is moved in the negative direction of the X-axis. Consequently, the pivoting arm 386 and the movable part 385 pivot in the opening direction, thereby allowing the bar work 9 to leave the centering unit 38. Thus, the bar work 9 can be loaded by jointly using the lifting unit 37 and the work loading assisting unit 39.

It should be noted that in the bar work loading apparatus 3 arranged as shown in FIG. 10 the sequence of steps for loading the bar work 9 may be made different from that in the third embodiment. That is, according to a fourth embodiment of the present invention, a centering unit capable of locking and unlocking the bar work 9 with respect to the axial direction under control as in FIG. 11 is used as the centering unit 38. The bar work 9 is alternately held with the centering unit 38 and the chuck 6, and the headstock 4 is moved vertically, thereby inserting the bar work 9 into the main spindle 5.

Figure 14:
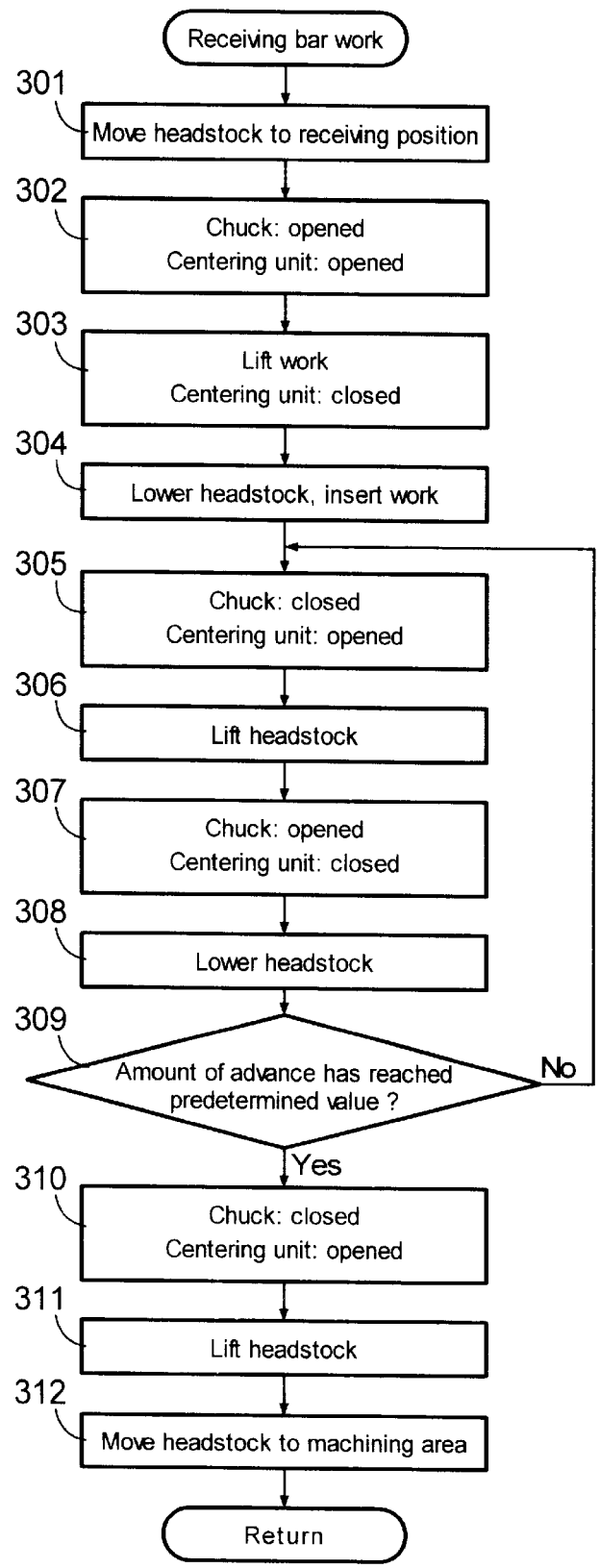
FIG. 14 is a flowchart showing a sequence of steps for loading a bar work in a fourth embodiment of the present invention.
Figure 15:
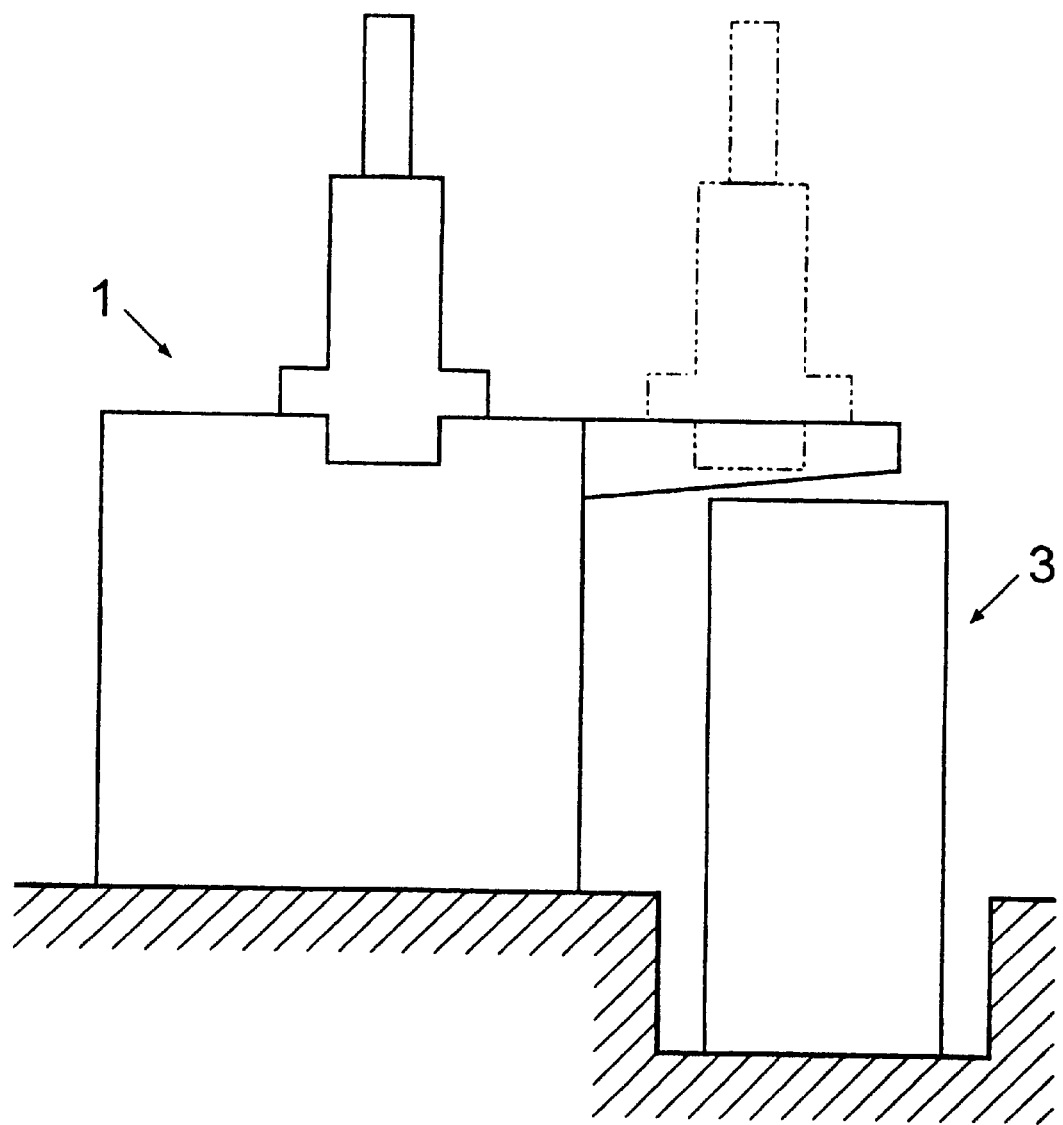
FIG. 15 is a front view showing a head traveling type vertical machine tool and a bar work loading apparatus according to the present invention which is installed in a pit formed in a floor surface.

FIG. 14 is a flowchart showing a sequence of steps for loading a bar work 9 according to the fourth embodiment. At step 301, in a state where no bar work 9 is held with the chuck 6, the headstock 4 is moved in the X-axis direction to a position where the chuck 6 lies above the work receiving position A. At step 302, the chuck 6 is opened so that a bar work 9 can be inserted thereinto. In addition, the centering unit 38 is opened so that the bar work 9 can pass through the space between the centering unit body 381 and the movable part 382.

Next, at step 303, the bar work 9 is lifted by the lifting unit 37 to the position for insertion into the chuck 6. Then, the centering unit 38 is closed to center the upper end portion of the bar work 9 and to lock it with respect to the axial direction. Next, at step 304, the headstock 4 is lowered in the Z-axis direction to a position near the lower limit position where it does not interfere with the centering unit 38, to insert the bar work 9 into the chuck 6. Next, at step 305, the chuck 6 is closed to hold the bar work 9. In addition, the centering unit 38 is opened to allow the bar work 9 to move in the axial direction. Next, at step 306, the headstock 4 is lifted, causing the bar work 9 to lift.

Next, at step 307, the centering unit 38 is closed to lock the bar work 9 with respect to the axial direction. In addition, the chuck 6 is opened to allow the bar work 9 to enter the main spindle 5. Next, at step 308, the headstock 4 is lowered to advance the bar work 9 into the main spindle 5. At step 309, it is judged whether or not the amount of advance of the bar work 9 into the main spindle 5 has reached a predetermined value. If the amount of advance has not yet reached the predetermined value, the process returns to step 305 to advance the bar work 9 further into the main spindle 5. If it is judged at step 309 that the amount of advance of the bar work 9 has reached the predetermined value, the process proceeds to step 310.

At step 310, the chuck 6 is closed to hold the bar work 9. In addition, the centering unit 38 is opened to allow the bar work 9 to move in the axial direction. At step 311, the headstock 4 is lifted, causing the bar work 9 to leave the centering unit 38. At step 312, the headstock 4 is moved into the machining area 17.

Thus, the bar work 9 is alternately held with the centering unit 38 serving as a work locking unit, which is capable of locking and unlocking the bar work 9 with respect to the axial direction, and the chuck 6, thereby inserting the bar work 9 into the main spindle 5 in a plurality of steps. Therefore, even a bar work 9 that is longer than the stroke of the headstock 4 in the Z-axis direction can be automatically inserted into the main spindle 5. Accordingly, it becomes possible to perform automatic loading of bar works 9. Because the stroke of the headstock 4 in the Z-axis direction need not be increased excessively, the cost of the machine tool will not be increased.

Although in the fourth embodiment the lifting unit 37 and the centering unit 38 are used jointly, the arrangement may be such that the lifting unit 37 is omitted, and the bar work 9 is inserted into the chuck 6 simply by lowering the headstock 4 as in the case of the first embodiment. In other words, it is only necessary to provide a unit capable of locking and unlocking the bar work 9 with respect to the axial direction under control, and the unit does not always need a centering function.

Although in the foregoing embodiments the axial direction (Z-axis direction) of the main spindle 5 extends in the vertical direction, it should be noted that the present invention is also applicable to a machine tool in which the Z-axis direction is tilted at a predetermined angle with respect to the vertical direction. Although in the foregoing description a vertical lathe has been taken as an example of machine tools, the present invention is applicable not only to a vertical lathe but also to any other machine tool such as a turning center, a grinding machine, or a machining center. Although the present invention has been described in regard to a machine tool in which the headstock 4 is movable in both the X- and Z-axis directions, the present invention is also applicable to a machine tool in which the headstock is movable not only in the X- and Z-axis directions but also in a Y-axis direction perpendicularly intersecting the X- and Z-axes.

In a case where the axial length of bar works to be loaded is longer than the distance from the chuck surface when the headstock lies at the highest position to the bottom surface of the bar work loading apparatus, the bar work loading apparatus should be installed in a pit (recess) below the floor surface of the factory. By doing so, even longer bar works can be machined without changing the size of the machine tool.

Although in the foregoing description the bar work loading apparatus holds bar works placed in side-by-side relation on the same circumference, the arrangement may be such that bar works are placed horizontally on an inclined chute that slopes from the front or rear surface of the machine tool, and the bar work loading apparatus holds a bar work coming to the work receiving position and changes the posture of the bar work with a posture-changing cylinder or the like so that the bar work extends in a direction parallel to the axis of the main spindle.

The present invention arranged as stated above provides the following advantageous effects.

A bar work loading apparatus that holds bar works in parallel to the axis of the main spindle is provided in the vicinity of a head traveling type vertical machine tool in side-by-side relation to the latter, and each bar work is loaded into the main spindle by movement of the headstock. Therefore, it becomes possible to machine the bar works continuously by the head traveling type vertical machine tool while loading them automatically. In addition, because a bar work is allowed to project from a chuck by a predetermined length by utilizing gravity, a driving mechanism for projecting the bar work is not needed. Moreover, because the bar work loading apparatus is provided in side-by-side relation to the head traveling type vertical machine tool at a low position facing opposite to the chuck, the overall height of the system comprising the machine tool and the bar work loading apparatus is favorably low. Therefore, the system will not interfere with the ceiling or the like of the factory, and it is possible to install the bar work loading apparatus in a factory with the normal ceiling height. Furthermore, the operation carried out by an operator to set bar works into the bar work loading apparatus is performed at a favorably low position and hence easy to perform. Moreover, there is no likelihood that the operator may drop a bar work accidentally. Thus, the bar work loading operation also improves in safety.

Because a bar work is inserted into the main spindle in a plurality of steps by using staircase-shaped abutment surfaces formed on a work loading assisting unit, even a bar work that is longer than the stroke of the headstock in the Z-axis direction can be automatically inserted into the main spindle. Thus, it is possible to perform automatic loading of bar works. In addition, because the stroke of the headstock in the Z-axis direction need not be increased excessively, the cost of the machine tool will not be increased.

Because a bar work is lifted by a lifting unit, even if the pitch for holding bar works is reduced to hold an increased number of bar works, each bar work can be automatically loaded without interference between any of the other bar works and the headstock. Accordingly, it is possible to increase the number of bar works to be held by the bar work-loading apparatus and hence possible to perform continuous automatic running of the machine tool over a long period of time. If the driving stroke of the lifting unit is set substantially equal to the axial length of the bar work, loading of the bar work can be completed by a single lifting operation. Accordingly, loading of the bar work can be effected in a short period of time.

Furthermore, the bar work is alternately held with a work locking unit, which is capable of locking and unlocking the bar work with respect to the axial direction, and the chuck, thereby inserting the bar work into the main spindle in a plurality of steps. Therefore, even a bar work that is longer than the stroke of the headstock in the Z-axis direction can be automatically inserted into the main spindle. Accordingly, it becomes possible to perform automatic loading of such bar works. Because the stroke of the headstock in the Z-axis direction need not be increased excessively, the cost of the machine tool will not be increased.

Because the upper end portion of a bar work at the work receiving position is centered by a centering unit, the accuracy of position of the upper end of the bar work improves. Therefore, the bar work can be surely inserted into even a collet chuck or other similar chuck that has a relatively narrow opening.

It should be noted that the present invention is not necessarily limited to the foregoing embodiments but can be modified in a variety of ways without departing from the gist of the present invention.

What is claimed is:

1. A bar work loading apparatus and a head traveling type vertical machine tool, said head traveling type vertical machine tool having:
a main spindle, which has a hollow central portion provided as a pathway for a bar work, having an axis of rotation extending approximately in a vertical direction;
a headstock rotatably supporting said main spindle, said headstock being movable in at least a direction of the axis of said main spindle and a direction perpendicularly intersecting the axis of said main spindle;
a chuck, which has a hollow central portion that enables said bar work to be inserted into said main spindle, provided at a lower end of said main spindle; and
a controller for controlling movement of said headstock and rotation of said main spindle and also controlling an opening and closing operation of said chuck;
said bar work loading apparatus being provided in a vicinity of said head traveling type vertical machine tool in side-by-side relation to load said head traveling type vertical machine tool, said bar work loading apparatus comprising:
a holding member capable of holding at least one bar work whose axial length is longer than a diameter thereof in such a manner that an axial direction of said bar work is parallel to the direction of the axis of said main spindle at least at a work receiving position where said chuck receives said bar work,
wherein said holding member faces opposite to said chuck at said work receiving position in a direction perpendicular to the axis of said main spindle.

2. A bar work loading apparatus and a head traveling type vertical machine tool according to claim 1, wherein said headstock is movable only in the direction of the axis of said main spindle and in a horizontal direction perpendicularly intersecting the axis of said main spindle, and
said work receiving position of said holding member is on a path of travel in the horizontal direction of the center axis of said main spindle.

3. A bar work loading apparatus and a head traveling type vertical machine tool according to claim 1, further comprising:
a work locking unit provided in a vicinity of said work receiving position of said holding member, said work locking unit being capable of axially locking and unlocking said bar work at said work receiving position.

4. A bar work loading apparatus and a head traveling type vertical machine tool according to claim 3, further comprising:
a centering unit provided in a vicinity of said work receiving position of said holding member to center an upper end portion of said bar work at said work receiving position.

5. A bar work loading apparatus and a head traveling type vertical machine tool according to claim 1, wherein said holding member is capable of swiveling with a plurality of said bar works held thereon and capable of positioning a desired bar work with respect to said work receiving position by swiveling.

6. A bar work loading apparatus and a head traveling type vertical machine tool according to claim 1, which is installed in a pit formed in a floor surface.

7. A bar work loading method for use in a system including a head traveling type vertical machine tool and a bar work loading apparatus,
said head traveling type vertical machine tool having;
a main spindle having an axis of rotation extending approximately in a vertical direction;
a headstock rotatably supporting said main spindle, said headstock being movable in at least a direction of the axis of said main spindle and a direction perpendicularly intersecting the axis of said main spindle;
a chuck provided at a lower end of said main spindle; and
a controller for controlling movement of said headstock and rotation of said main spindle and also controlling an opening and closing operation of said chuck;

said bar work loading apparatus being provided in a vicinity of said head traveling type vertical machine tool in side-by-side relation to load said head traveling type vertical machine tool, said bar work loading apparatus having:
a holding member capable of holding at least one bar work whose axial length is longer than a diameter thereof in such a manner that an axial direction of said bar work is parallel to the direction of the axis of said main spindle at least at a work receiving position where said chuck receives said bar work,
wherein said holding member faces opposite to said chuck at said work receiving position in a direction perpendicular to the axis of said main spindle;
said method comprising the steps of:
moving said headstock to said work receiving position;
inserting said bar work into said main spindle from a side thereof closer to said chuck; and
advancing said bar work further into said main spindle by moving said headstock and said bar work relative to each other.

8. A bar work loading method according to claim 7, wherein said bar work loading apparatus has a work locking unit provided in a vicinity of said work receiving position of said holding member, said work locking unit being capable of axially locking and unlocking said bar work at said work receiving position,
wherein said step of inserting said bar work into said main spindle from a side thereof closer to said chuck is carried out by lowering said headstock in the direction of the axis of said main spindle, and
wherein said step of advancing said bar work further into said main spindle by moving said haedstock and said bar work relative to each other comprises the steps of:
opening said work locking unit and closing said chuck and then lifting said headstock, thereby lifting said bar work held by said chuck, and
closing said work locking unit and opening said chuck and then lowering said headstock, thereby advancing said bar work further into said main spindle.

9. A bar work loading apparatus for a head traveling type vertical machine tool,
said head traveling type vertical machine tool having:
a main spindle having an axis of rotation extending approximately in a vertical direction;
a headstock rotatably supporting said main spindle, said headstock being movable in at least a direction of the axis of said main spindle and a direction perpendicularly intersecting the axis of said main spindle;
a chuck provided at a lower end of said main spindle; and
a controller for controlling movement of said headstock and rotation of said main spindle and also controlling an opening and closing operation of said chuck;
said bar work loading apparatus being provided in a vicinity of said head traveling type vertical machine tool in side-by-side relation to load said head traveling type vertical machine tool, said bar work loading apparatus comprising:
a holding member capable of holding at least one bar work whose axial length is longer than a diameter thereof in such a manner that an axial direction of said bar work is parallel to the direction of the axis of said main spindle at least at a work receiving position where said chuck receives said bar work,
wherein said holding member faces opposite to said chuck at said work receiving position in a direction perpendicular to the axis of said main spindle,
said headstock is movable only in the direction of the axis of said main spindle and in a horizontal direction perpendicularly intersecting the axis of said main spindle,
said work receiving position of said holding member is on a path of travel in the horizontal direction of the center axis of said main spindle, and
a lifting unit is provided in a vicinity of said work receiving position of said holding member to lift said bar work at said work receiving position in the axial direction.

10. A bar work loading apparatus for a head traveling type vertical machine tool,
said head traveling type vertical machine tool having:
a main spindle having an axis of rotation extending approximately in a vertical direction;
a headstock rotatably supporting said main spindle, said headstock being movable in at least a direction of the axis of said main spindle and a direction perpendicularly intersecting the axis of said main spindle;
a chuck provided at a lower end of said main spindle; and
a controller for controlling movement of said headstock and rotation of said main spindle and also controlling an opening and closing operation of said chuck;
said bar work loading apparatus being provided in a vicinity of said head traveling type vertical machine tool in side-by-side relation to load said head traveling type vertical machine tool, said bar work loading apparatus comprising:
a holding member capable of holding at least one bar work whose axial length is longer than a diameter thereof in such a manner that an axial direction of said bar work is parallel to the direction of the axis of said main spindle at least at a work receiving position where said chuck receives said bar work,
wherein said holding member faces opposite to said chuck at said work receiving position in a direction perpendicular to the axis of said main spindle, and
a work loading assisting unit is provided at a position in a vicinity of said work receiving position of said holding member and in a range within which the center of said main spindle is movable, said work loading assisting unit being provided with a staircase-shaped abutment surface for supporting said bar work.

11. A bar work loading apparatus for a head traveling type vertical machine tool,
said head traveling type vertical machine tool having:
a main spindle having an axis of rotation extending approximately in a vertical direction;
a headstock rotatably supporting said main spindle, said headstock being movable in at least a direction of the axis of said main spindle and a direction perpendicularly intersecting the axis of said main spindle;
a chuck provided at a lower end of said main spindle; and
a controller for controlling movement of said headstock and rotation of said main spindle and also controlling an opening and closing operation of said chuck;
said bar work loading apparatus being provided in a vicinity of said head traveling type vertical machine tool in side-by-side relation to load said head traveling type vertical machine tool, said bar work loading apparatus comprising:
a holding member capable of holding at least one bar work whose axial length is longer than a diameter thereof in such a manner that an axial direction of said bar work is parallel to the direction of the axis of said main spindle at least at a work receiving position where said chuck receives said bar work,
wherein said holding member faces opposite to said chuck at said work receiving position in a direction perpendicular to the axis of said main spindle, and
a lifting unit provided is in a vicinity of said work receiving position of said holding member to lift said bar work at said work receiving position in the axial direction.

12. A bar work loading method for use in a system including a head traveling type vertical machine tool and a bar work loading apparatus,
said head traveling type vertical machine tool having;
a main spindle having an axis of rotation extending approximately in a vertical direction;
a headstock rotatably supporting said main spindle, said headstock being movable in at least a direction of the axis of said spindle and a direction perpendicularly intersecting the axis of said main spindle;
a chuck provided at lower end of said main spindle; and
a controller for controlling movement of said headstock and rotation of said main spindle and also controlling an opening and closing operation of said chuck;
said bar work loading apparatus being provided in a vicinity of said head traveling type vertical machine tool in side-by-side relation to load said head traveling type vertical machine tool, said bar work loading apparatus having:
a holding member capable of holding at least one bar work whose axial length is longer than a diameter thereof in such a manner that an axial direction of said bar work is parallel to the direction of the axis of said main spindle at least at a work receiving position where said chuck receives said bar work,
wherein said holding member faces opposite to said chuck at said work receiving position in a direction perpendicular to the axis of said main spindle;
said method comprising the steps of:
moving said headstock to said work receiving position;
inserting said bar work into said main spindle from a side thereof closer to said chuck; and
advancing said bar work further into said main spindle by moving said headstock and said bar work relative to each other,
wherein said bar work loading apparatus has a work loading assisting unit provided at a position in a vicinity of said work receiving position of said holding member and in a range within which the center of said main spindle is movable, said work loading assisting unit being provided with a staircase-shaped abutment surface for supporting said bar work,
wherein said step of inserting said bar work into said main spindle from a side thereof closer to said chunk is carried out by lowering said headstock in the direction of the axis of said main spindle, and
wherein said step of advancing said bar work further into said main spindle by moving said headstock and said bar work relative to each other comprises the steps of:
moving said headstock so that a distal end of said bar work held by said chuck abuts on said abutment surface of said work loading assisting unit, and
opening said chuck and lowering said headstock, thereby advancing said bar work further into said main spindle.

13. A bar work loading method for use in a system including a head traveling type vertical machine tool and a bar work loading apparatus,
said head traveling type vertical machine tool having;
a main spindle having an axis of rotation extending approximately in a vertical direction;
a headstock rotatably supporting said main spindle, said headstock being movable in at least a direction of the axis of said main spindle and a direction perpendicularly intersecting the axis of said main spindle;
a chuck provided at a lower end of said main spindle; and
a controller for controlling movement of said headstock and rotation of said main spindle and also controlling an opening and closing operation of said chuck;
said bar work loading apparatus being provided in a vicinity of said head traveling type vertical machine tool in side-by-side relation to load said head traveling type vertical machine tool, said bar work loading apparatus having:
a holding member capable of holding at least one bar work whose axial length is longer than a diameter thereof in such a manner that an axial direction of said bar work is parallel to the direction of the axis of said main spindle at least at a work receiving position where said chuck receives said bar work,
wherein said holding member faces opposite to said chuck at said work receiving position in a direction perpendicular to the axis of said main spindle;
said method comprising the steps of:
moving said headstock to said work receiving position;
inserting said bar work into said main spindle from a side thereof closer to said chuck; and
advancing said bar work further into said main spindle by moving s aid headstock and said bar work relative to each other,
wherein said bar work loading apparatus has a lifting unit provided in a vicinity of said work receiving position of said holding member to lift said bar work a t said work receiving position in the axial direction,
wherein said step of inserting said bar work into said main spindle from a side thereof closer to said chuck is carried out by lifting said bar work with said lifting unit, and
wherein said step of advancing said bar work further into said main spindle by moving said headstock and said bar work relative to each other is carried out by lifting said bar work with said lifting unit.

14. A bar work loading method for use in a system including a head traveling type vertical machine tool and a bar work loading apparatus,
said head traveling type vertical machine tool having;
a main spindle having an axis of rotation extending approximately in a vertical direction;
a headstock rotatably supporting said main spindle, said headstock being movable in at least a direction of the axis of said spindle and a direction perpendicularly intersecting the axis of said main spindle;
a chuck provided at a lower end of said main spindle; and a controller for controlling movement of said headstock and rotation of said main spindle and also controlling an opening and closing operation of said chuck;

said bar work loading apparatus being provided in a vicinity of said head traveling type vertical machine tool in side-by-side relation to load said head traveling type vertical machine tool, said bar work loading apparatus having:

a holding member capable of holding at least one bar work whose axial length is longer than a diameter thereof in such a manner that an axial direction of said bar work is parallel to the direction of the axis of said main spindle at least at a work receiving position where said chuck receives said bar work, wherein said holding member faces opposite to said chuck at said work receiving position in a direction perpendicular to the axis of said main spindle;

said method comprising the steps of:

moving said headstock to said work receiving position;

inserting said bar work into said main spindle from a side thereof closer to said chuck; and advancing said bar work further into said main spindle by moving said headstock and said bar work relative to each other, wherein said bar work loading apparatus has:

a work loading assisting unit provided at a position in a vicinity of said work receiving position of said holding member and in a range within which the center of said main spindle is movable, said work loading assisting unit being provided with a staircase-shaped abutment surface for supporting said bar work; and a lifting unit provided in a vicinity of said work receiving position of said holding member to lift said bar work at said work receiving position in the axial direction;

wherein said step of inserting said bar work into said main spindle from a side thereof closer to said chuck is carried out by lifting said bar work with said lifting unit, or by lifting said bar work to a predetermined position with said lifting unit and lowering said headstock in the direction of the axis of said main spindle, thereby inserting said bar work into said main spindle, and wherein said step of advancing said bar work further into said main spindle by moving said headstock and said bar work relative to each other comprises the steps of:

moving said headstock so that a distal end of said bar work held by said chuck abuts on said abutment surface of said work loading assisting unit, and opening said chuck and lowering said headstock, thereby advancing said bar work further into said main spindle.

15. A bar work loading apparatus for a head traveling type vertical machine tool according to claim 11, further comprising:

a work locking unit provided in a vicinity of said work receiving position of said holding member, said work locking unit being capable of axially locking and unlocking said bar work at said work receiving position.

16. A bar work loading apparatus for a head traveling type vertical machine tool according to any one of claims 9, 10, 11 and 15 further comprising:

a centering unit provided in a vicinity of said work receiving position of said holding member to center an upper end portion of said bar work at said work receiving position.

17. A bar work loading method according to claim 13, wherein said bar work loading apparatus has a work locking unit provided in a vicinity of said work receiving position of said holding member, said work locking unit being capable of axially locking and unlocking said bar work at said work receiving position, wherein said step of inserting said bar work into said main spindle from a side thereof closer to said chuck is carried out by lowering said headstock in the direction of the axis of said main spindle, and wherein said step of advancing said bar work further into said main spindle by moving said headstock and said bar work relative to each other comprises the steps of:

opening said work locking unit and closing said chuck and then lifting said headstock, thereby lifting said bar work held by said chuck, and closing said work locking unit and opening said chuck and then lowering said headstock, thereby advancing said bar work further into said main spindle.

* * * * *